Sept. 9, 1958 L. W. HUSSEY 2,851,219

SERIAL ADDER

Filed May 18, 1951 2 Sheets-Sheet 1

INVENTOR
L. W. HUSSEY
BY H. A. Burgess
ATTORNEY

Sept. 9, 1958 L. W. HUSSEY 2,851,219

SERIAL ADDER

Filed May 18, 1951 2 Sheets-Sheet 2

INVENTOR
L. W. HUSSEY

BY H. A. Burgess
ATTORNEY

1

2,851,219

SERIAL ADDER

Luther W. Hussey, Sparta, N. J., assignor to Bell Telephone Laboratories, Incorporated, New York, N. Y., a corporation of New York Application May 18, 1951, Serial No. 227,059

2 Claims. (Cl. 235—61)

This invention relates to digital computers and more particularly to carry circuits for serial adders.

One object of the invention is to eliminate feedback from the carry circuits in serial adders.

Another object of the invention is to avoid the necessity of resetting the carry circuit upon the application of every pair of digits to be added.

Another object of the invention is a serial binary adder which does not require an And Not gate.

Other objects of the invention relate in general to the simplification of circuits and operation of serial adders and particularly the carry circuits for such adders.

The carry for a serial binary adder in accordance with a specific illustrative embodiment of the invention which will be described in detail below is provided by a bistable device having two inputs. A pulse applied to one of the inputs sets the device to one of its stable states while a pulse applied to the other input sets the device to the other of its stable states. These states are manifested at an output of the device by direct-current voltages which are arbitrarily designated "1" and "0." The adder itself also has two inputs to which are applied voltages indicating the digits to be added; these digits are similarly designated "1" and "0." The adder operates in accordance with the usual binary relations, for example, if digits 1 and 0 are applied to the inputs, the output will be a 1 with no carry; if digits 1 and 1 are applied to the adder the output will be a 0 and the carry will be a 1. The carry in each instance adds to the succeeding pair of digits.

In accordance with the aforementioned specific embodiment, the adder requires at each of its two inputs two voltages, one indicative of the digit to be added and the other indicative of the opposite digit. These voltages are utilized to reset the bistable device, but only when the digits to be added are both different from the carry digit resulting from the next previous addition. For all other combinations of inputs and carry digits, the bistable device remains quiescent. A feature of this carry circuit is that no feedback is employed—the carry being controlled directly by the input digits; it has therefore been designated a "direct" carry.

The illustrative embodiments of the invention about to be described employ various types of gates. By way of definition, an $n$ control threshold $r$ gate is a device which may be stimulated or energized by any combination of $n$ inputs and which responds or produces an output when any $r$ inputs or stimuli are impressed simultaneously, $r$ and $n$ being integers. Such a gate may also have an inhibiting input which, if stimulated, will prevent the gate from producing an output regardless of how many enabling inputs are simultaneously present. A coincidence or And gate will produce an output only upon a coincidence of enabling inputs. If the coincidence gate also includes an inhibiting input no output will be produced if an inhibiting signal is applied to the inhibiting input regardless of any coincidence of enabling inputs. An anticoincidence or And Not gate has two inputs and produces an output only if one and only one input is enabled at any one time. The specific gates used herein for illustrative purposes are generally as described in my copending application Serial No. 198,688, filed December 1, 1950 which issued on April 21, 1953 as Patent 2,636,133.

Other objects, features and principles of the present invention may be better understood from a consideration of the following detailed description when read in accordance with the attached drawings in which.

Figure 1:
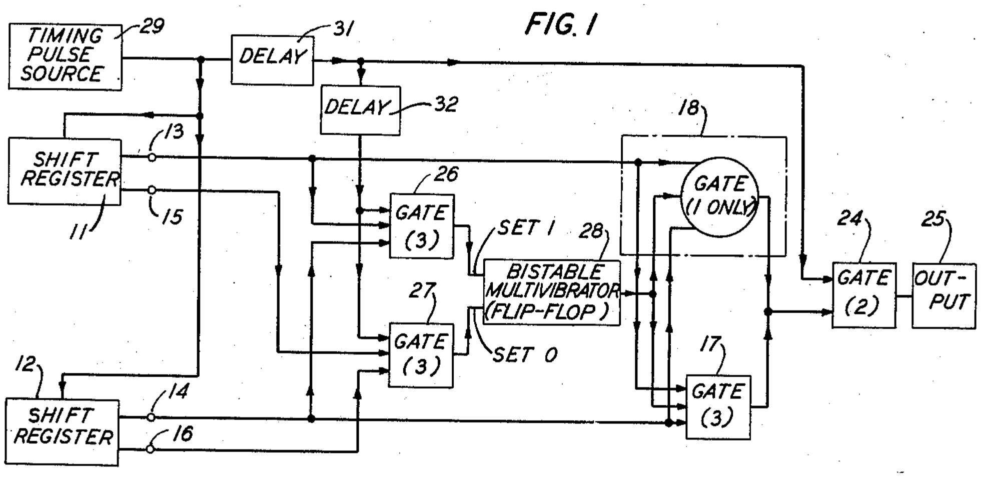
Figs. 1 and 2 illustrate by block schematic diagram a serial binary adder employing principles of the present invention.

There is shown in Fig. 1 a serial adder adapted to add the digits appearing at the output of the two shift registers 11 and 12. Two discrete voltages appear at the two output terminals 13—15 and 14—16 of each shift register which may be either of opposite polarity or merely different magnitudes of the same polarity. For present purposes, these voltages will be assumed to be of opposite polarity so that one output terminal of each shift register will show a plus voltage while the other terminal shows a negative voltage. Further, for present purposes a plus voltage will be assumed to represent the digit 1 and a negative voltage the digit 0. The upper output terminals 13 and 14 of each register display the polarities indicative of the digits to be added while the lower terminals 15 and 16 display the opposite polarities to those appearing at terminals 13 and 14, respectively. The digits to be added are each applied as separate inputs to both a "three-control threshold three" gate 17 and a "1-only" gate 18, the latter also having three inputs. The gate 17 will produce an output only when the three inputs are the digit 1, i. e., voltages indicative of the digit 1, and the gate 18 will produce an output only when one and only one input is the digit 1, the outputs produced in both cases being indicative of the digit 1.

Figure 2:
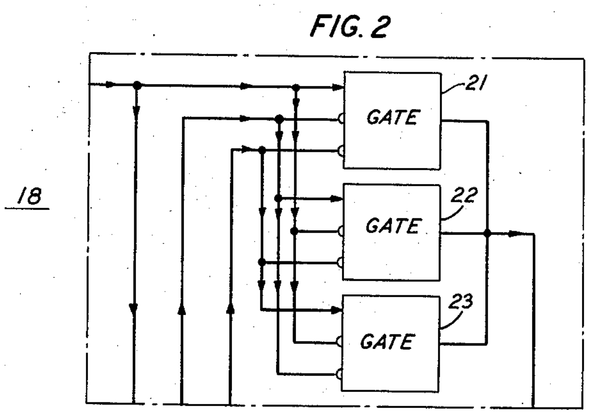
Figure 5:
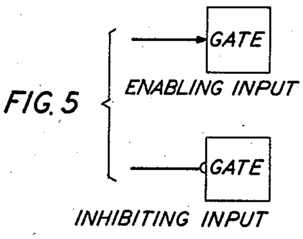
Fig. 5 illustrates graphical representations employed in the other figures of the drawings.

The operation of the "1-only" gate may be better understood by referring to Fig. 2. The gate 18 itself is made up of three gates 21, 22, and 23 having their outputs tied together and each having one enabling input and two inhibiting inputs; the nature of the inputs may be understood by referring to Fig. 5. The three inputs to the 1-only gate are each applied to the enabling input of one gate and the inhibiting inputs of the other two gates as shown in Fig. 2. By this combination each input pulse will enable one of the elemental gates but will inhibit the other two. There will therefore be an output only if one pulse is applied to any input at any one time. The illustrative circuit of Fig. 2 assumes that the enabling and inhibiting controls are operated by pulses of the same polarity or magnitude. Pulse inverters may be included in an obvious manner, for example, in series with the inhibiting inputs, if pulses of opposite polarity are required to operate the two types of controls.

A voltage indicative of the carry digit appears at the output of the bistable multivibrator 28 and is applied to an input of gate 17 as well as an input of gate 18; the gates 17 and 18, therefore, each receive at three inputs, respectively, the two digits to be added plus the carry digit. The output voltages of the multivibrator 28 are similar to the output voltages of the shift registers 11 and 12. The outputs of the gates 17 and 18 are combined in a first enabling input of a coincidence gate 24 whose resulting output is applied to an output circuit 25.

When the output of either gate 17 or gate 18 is a voltage indicating the digit 1, this digit will be transmitted to the output 25 under control of a timing pulse from source 29 which is applied to a second enabling input of gate 24 via delay 31.

The carry circuit comprises the two three-control threshold three gates 26 and 27 and the bistable multivibrator or "flip-flop" 28. Multivibrator 28 may be termed the "carry register" since it registers, and indicates by its output voltage, the carry digit. The gates 26 and 27 are both designed to be enabled by positive voltages, i. e., by digit 1 voltages. Neglecting for the moment the timing pulses applied to the inputs of the gates 26 and 27 from the timing pulse source 29, the gate 26 has applied to it the digits to be added which appear at the terminals 13 and 14 while the gate 27 has applied to it the digits appearing at the output of each register other than the digits to be added, i. e., the digits appearing at terminals 15 and 16. The output of the gate 26 is applied to the "set 1" input of the bistable multivibrator 28 and the output of the gate 27 is applied to the "set 0" input of the bistable device. A pulse applied to the "set 1" input of the bistable device 28 will set the device in its stable state which produces the digit 1 at its output, unless already in this state, while a pulse applied to the set 0 input will set it in its other stable state unless already in the latter state. By neglecting the timing pulses, the gates 26 and 27 may for present purposes be considered as "two-control threshold two" gates. It may thus be seen that if the digits to be added appearing at terminals 13 and 14 are both 1's, the gate 26 will respond with an output which will trigger the bistable device 28 to its stable state represented by a 1 at its output unless it was already in this state. When the digits appearing at terminals 13 and 14 are both 1's the digits appearing at terminals 15 and 16 will be both 0's, but as previously mentioned the latter are represented by voltages of negative polarity which will not enable the gate 27. However, when the digits to be added at terminals 13 and 14 are both 0's, the digits at terminals 15 and 16 are both 1's which will enable the gate 27 and produce an output which will set the bistable device to its stable stage represented by a 0 at its output unless it was already in this state. The binary character of the digit stored in the carry register 28 and hence the output voltage of the carry register is changed, therefore, only:

1. If set to 0 and the input digits to be added are both 1's; or
2. If set to 1 and the input digits are both 0's.

Briefly, the operation of the circuit of Fig. 1, still neglecting the timing pulses is as follows: assuming the carry as represented by the output of the bistable device 28 to be set to 0, if the input digits to be added are 1 and 0, the 1-only gate 18 will respond and produce a 1 at its output which is transmitted through the coincidence gate 24 to the output circuit 25; neither gate 26 nor 27 is enabled to change the condition of the carry since the input digits are unlike. If the input digits are both 0's neither gate 17 nor 18 will be enabled nor will the carry circuit be changed since the input digits, although alike, are the same as the digit already appearing at the output of the carry device. If the input digits are both 1's neither gate 17 nor 18 will be enabled, the former since it responds only if one and only one input is enabled and the latter because it requires three simultaneous inputs to produce an output. The gate 26, however, will respond and set the flip-flop 28 to 1. The carry digit is then added to the succeeding pair of digits. Assuming the next pair to be (1, 0), the adder output will be 0 (1+1+0) and the output of the carry will remain at 1. The results of other inputs will appear in an obvious manner.

Programming is provided by pulses from the timing source 29 which control the sequence of operation. First, a pulse is applied to each of the shift registers to set up the digits to be added at their outputs 13 and 14. This same pulse, delayed by the delay circuit 31 is applied as an enabling input to the coincidence gate 24 to "read out" the result of the addition of these digits to the carry digit from the previous addition, which result appears at the combined outputs of the gates 17 and 18. The same pulse further delayed by the delay circuit 32 is applied as an enabling input to each of the gates 26 to reset the carry circuit, if necessary. The sequence of operations, briefly, is:

1. Set up;
2. Read out; and
3. Reset carry, if necessary.

Figure 3:
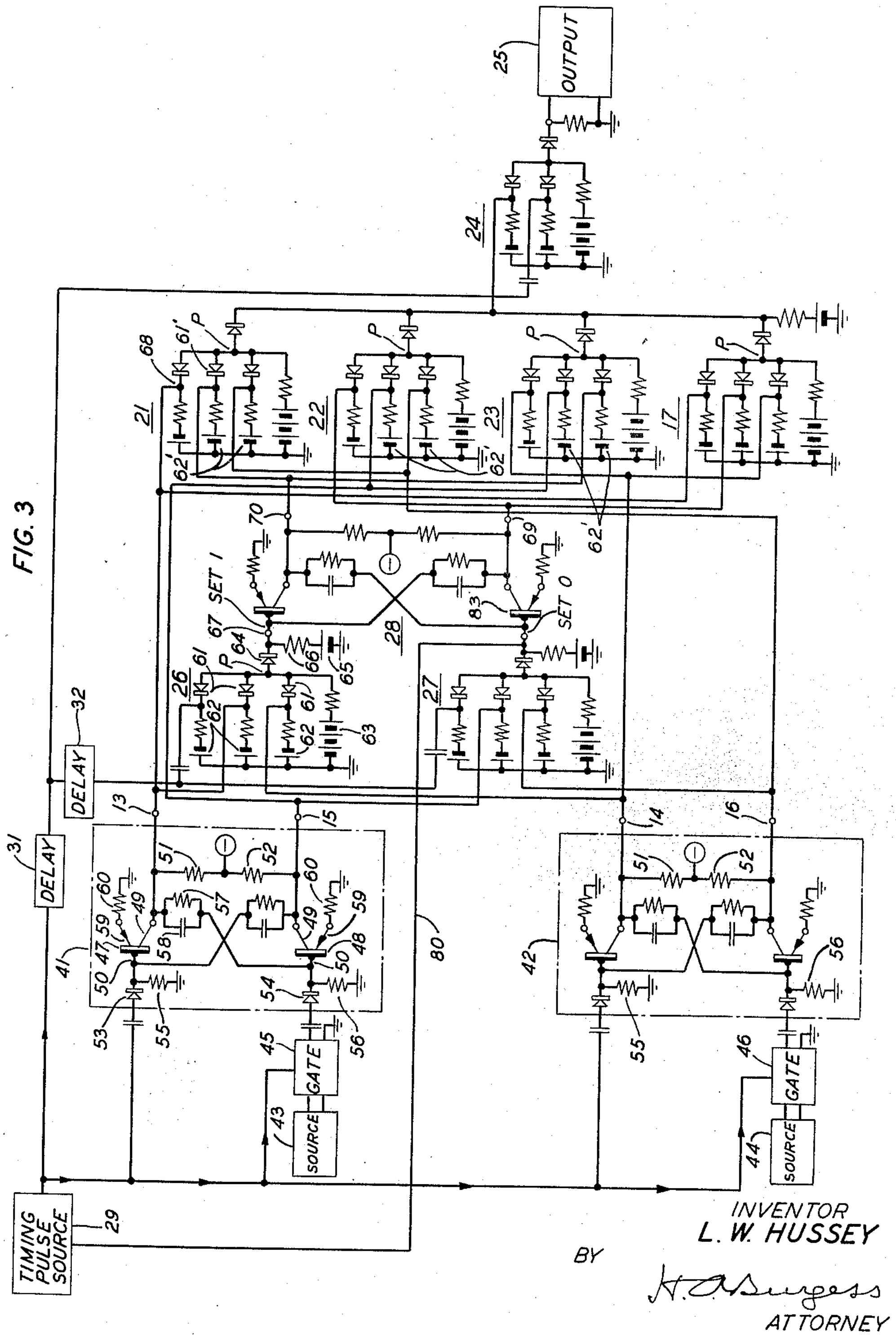
Fig. 3 illustrates schematically details of an adder of the type shown in Fig. 1.

The circuit details of an adder in accordance with the block diagram of Fig. 1 are illustrated by Fig. 3. The inputs to the adder have been represented as bistable devices 41 and 42, each of which may comprise, for example, a single stage shift register or which may merely be the last stage of a multistage shift register. To each of the shift registers is fed information from a pair of sources 43 and 44 through the gates 45 and 46 in the form of voltages representing the digits to be added. This information is in the form of numbers in binary code. Digits of equal significance from the two sources are fed to the adder in ascending order of significance under the control of the gates 45 and 46.

The shift registers 41 and 42, or storage units as that may be deemed, each comprises a bistable transistor multivibrator having two transistors 47 and 48 with cross connected collector 49 and base electrodes 50. Transistors are now well known in the art and are described for example in Patent 2,524,035 to W. H. Bardeen and J. Brattain dated October 3, 1950. Negative bias is applied to the collector electrodes 49 through the resistors 51 and 52. Emitter bias is derived by the "bleeder" resistors 60 through which each emitter electrode 59 is connected to ground. Triggering voltages are applied to the base electrodes 50 through the asymmetric devices or diodes 53 and 54 and appear as voltages across the input resistors 55 and 56. These multivibrators operate generally analogously to bistable vacuum tube multivibrators having cross connected plates and grids, the base electrodes 50 corresponding to grids and the collector electrodes 49 corresponding to plates or anodes. The multivibrators 41 and 42 are operable with either positive or negative pulses but are shown as operated by positive pulses.

Assuming the upper transistor 47 of the multivibrator 41 to be conducting, a positive pulse applied to the base electrode of transistor 47 reduces the collector current flowing through resistor 51. This causes a negative pulse to be applied to the base electrode of the other transistor 48 by way of the resistor 57 condenser 58 combination causing the latter to begin to draw current and raise the potential of the collector electrode 49 of transistor 48. This makes the base electrode of the upper transistor still more positive and eventually, the transistor 48 is conducting and the transistor 47 is cut off. Triggering is also aided by the common connection to ground of the emitter electrodes 59 through their respective bleeder resistors 60 since the emitter to base resistance of the conducting transistor is quite low. For example, when transistor 47 is conducting a positive pulse applied to its base electrode 50 also appears on the emitter electrode of the other transistor, thus promoting conduction in the latter.

In a similar manner, a positive pulse applied to the lower transistor 48 when the latter is conducting will also cause the conducting states of the two transistors to reverse. The diodes 53 and 54 isolate the input, i. e., the base electrode 50 of the conducting unit since they are biased in their high resistance condition by current flow through the resistors 55 and 56. For example, if the upper transistor is conducting, pulses applied to diode 53 of a magnitude less than the voltage drop across resistor 55 will have no effect on either transistor.

Assuming the multivibrators to be symmetrical, the potentials at the output terminals 13—15 and 14—16 will alternate between two values depending upon which of the transistors is conducting. In the illustrative example shown, these two values will both be negative voltages when referred to ground, but for the present purposes the lesser of the two negative potentials will be referred to as positive, the term being used in a relative manner. Further, this "positive" potential represents the digit 1 and the negative potential the digit 0.

As will be seen, it is the potentials on the upper output terminals of each multivibrator which represent the digits to be added. Since it is the conducting unit which produces the "positive" voltage at its output terminal, it may be seen that a positive pulse applied to the upper transistor 47 of the unit 41, for example, will produce the digit 0 voltage at terminal 13 while a positive pulse applied to the transistors 48, from the sources 43, will produce the digit 1 voltage at terminal 13.

The sequence of operations is started by a positive pulse from the timing pulse source 29 which is applied to the upper transistor 47 of each multivibrator, causing these transistors to produce potentials indicative of the digit 0, at terminals 13 and 14. The same pulse from the source 29 also operates the gates 45 and 46 to permit the next pair of digits from the source to be applied to the lower transistors of each pair. If these digits are 1's as manifested by positive pulses, the conducting states of the transistors will reverse, thereby producing 1's to be added at the terminals 13 and 14. Zeros, represented by either no pulse or a negative pulse from either of the sources will not disturb the units to which applied and hence, if zeros are applied, the 0's will remain at the output terminals 13 and 14.

The units just described are merely illustrative of one method of producing at each of two pairs of terminals two voltages, one of which represents the digit to be added, and the other of which represents the opposite digit. A complete shift register might comprise, for example *d* stages each similar to the units 41 and 42, where *d* is the number of digits in the number to be added. These units might be fed simultaneously in parallel with the least significant digit being fed to the most right-hand unit. A series of shift pulses, simultaneously applied to each stage of each shift register in the same manner as the pulses from the time source 29 are applied to the upper transistors 47, of the illustrative units shown, would advance the digits from left to right in a well-known manner so that digits of equal significance would successively appear at the outputs of the two shift registers to be added. When all the *d* digits are added the register would be cleared, i. e., each stage would be set to 0 and two new numbers of *d* digits each would be applied to the registers.

The gates 17, 21, 22, 23, 24, 26 and 27 employed in the circuit of Fig. 3 are switching type gates of the type disclosed in my aforementioned copending application. They are termed switching type gates in contradistinction to transmission type gates since their output bears no necessary relation to the inputs other than in time. Each of these gates comprises a plurality of asymmetrically conducting devices, herein termed diodes, which may comprise, for example, either devices of the germanium crystal rectifier type or vacuum tube diodes, having like terminals connected to a common junction point *p*. Referring specifically to the gate 26 which is similar in most respects to the other gates there is applied to the electrodes of the diodes 61 other than the electrodes connected to the junction point *p* a small negative bias by the batteries 62, the effect of which is to bias the diodes in their low resistance or conducting condition. While in this condition the current from the battery 63, which is substantially larger than the batteries 62, will flow through the conducting diodes and bias the output diode 64 in its high resistance condition. This is aided by a small battery 65 connected in series with a resistor 66 which applies a positive bias to the electrode of the output diode 64 remote from the junction poin *p* making the terminal 67 more positive than the junction point *p* in the absence of a coincidence of input pulses. Control voltages are applied to each of the control diodes 61 and more specifically to the electrodes of the diodes 61 remote from the junction point *p*. If one of the diodes is cut off by an input control voltage the current from the battery 63 will continue to flow through the diodes which remain in the conducting condition. The potential of point *p* will not rise appreciably and more specifically will not rise sufficiently to bias the output diode 64 in its low resistance condition if the batteries 62 are sufficiently large. If positive pulses are simultaneously applied to the three control diodes 61 to bias them in their high resistance condition, the potential of point *p* will rise sufficiently to bias the output diode 64 in its low resistance condition. Current from the battery will then flow through the output diode 64 and produce a positive pulse at the terminal 67 due to the voltage drop across the resistor 66. The gate 26, as shown, is a three-control threshold three gate having means to apply three input signals, one to each of the control diodes and producing an output signal only if the three input signals are simultaneously present.

An input control is made an inhibiting control by reversing the polarity of the small biasing battery 62 associated with that control as is shown by the batteries 62' in the gates 21, 22 and 23 and by applying input pulses of the opposite polarity which in the disclosed embodiment means the digit 0 or more negative pulses. For example, the diode 61' of gate 21 is normally non-conducting so that if an enabling (digit 1) pulse is applied to the input 68, an output pulse will be produced. However, if a negative pulse is applied to diodes 61' to bias it in its low resistance condition, the gate is inhibited and will produce no output pulse even though an enabling input is applied to input 68. Each of the gates 21 through 23, which comprise the "1-only" gate, have two inhibiting controls and one enabling control. The control voltages for these gates appear at the outputs of the three multi-vibrators which produce not only the digit voltage to be added at one terminal, viz. terminals 13, 14 and 69, respectively, but also the opposite digit voltages at another terminal, viz. terminals 15, 16 and 70. Enabling control voltages for gates 21, 22 and 23 are thus derived from terminals 13, 14, and 69 of the flip-flops 41, 42, and 28, respectively, and inhibiting voltages from terminals 15, 16 and 70. As previously indicated, all control voltages could be derived from either set of three terminals 13, 14 and 69, or, 15, 16 and 70, using pulse inverters to derive the opposite control voltages.

Since the voltages representing the digits 1 and 0 are both negative with the digit 0 voltage being the more negative of the two, each of the gates is made to respond to negative voltages; the digit 1 pulses are used for enabling and the digit 0 pulses for inhibiting. The resistors and batteries associated with each of the gates are thus proportioned so as to make the junction point *p* normally negative by the proper amount with respect to ground so that the digit 1 pulses, even though negative, are less negative than the potential of point *p* and will render the diode to which applied non-conducting.

The storage unit of the carry circuit comprises a transistor multivibrator similar to the two already described with the potential at the output terminal 69 indicating the carry digit.

The operation of the circuit is the same as that described in connection with Fig. 1. A pulse from the timing pulse source 29 initially sets up the digits to be added at the output terminals 13 and 14 of the storage units 41 and 42 with the voltages at the other terminals 15 and 16 representing the opposite digits. These are direct-current potentials which remain on the output terminals until a subsequent pulse from the timing pulse source alters the conducting states of the multivibrators.

The same pulse delayed by the delay circuit 31 is next applied to the output coincidence gate 24. If the digit 1 is present at the output of the three-control threshold three gate which it will be if the input digits are both 1's and if the carry digit stored is also a 1, or if the output of the 1-only gate is a 1, which it will be if the input digits comprise a 1 and a 0, and there is no carry from the preceding operation, the digit 1 will be applied to the output circuit 25. The operation just described is termed the "read out" operation.

The next step in the sequence of operations is to determine if the nature of the carry digit stored at the output of the bistable device is to be changed. This is accomplished by the same pulse from the timing pulse source further delayed by the delay circuit 32 which is applied to an enabling control of each of the three-control threshold three gates 26 6and 27 to render non-conducting the diodes 61 to which applied. If the digits at the terminals 13 and 14 are both 1's, the other two diodes of the gate 26 will also be rendered non-conducting. This coincidence will produce a positive pulse at the output of the gate 26 which appears at the "set 1" terminal 67 of the carry storage unit 28. This latter pulse triggers the lower transistor 83 into the conducting state so as to set the output terminal 69 to 1 unless it was already in a conducting state in which case it will remain unchanged. In a similar manner, if the input digits are both 0's the gate 27 will produce a positive output pulse and set the output of the carry storage unit to 0 unless it were already at 0. If the digits to be added, in groups; represent successive numbers, the carry may be reset to 0 at the end of each pair of numbers by a pulse from the source 29 over lead 80.

Figure 4:
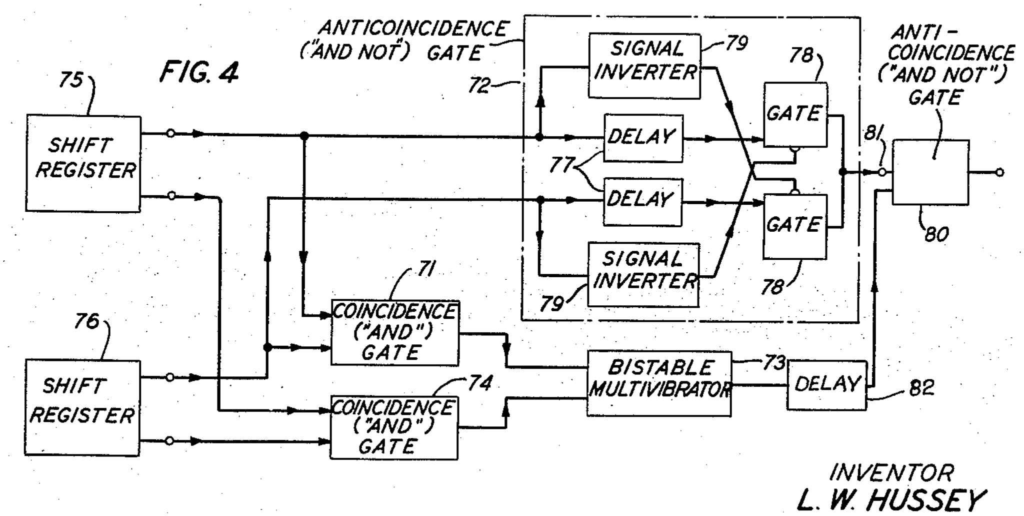
Fig. 4 shows by block schematic diagram another type of serial adder to which principles of the present invention have been applied.

Referring now to Fig. 4, the principles of the present invention are also applicable to serial adders of other types. The adder of Fig. 4 is of the type which comprises two half adders. The first of the half adders determines the partial sum and the second half adder the final sum. The And gate 71 and the And Not gate 72 comprise a half adder. This type of adder is described, for example, in a book entitled "Calculating Instruments and Machines," by D. R. Hartree, Illinois University Press 1949 at page 104, Fig. 58. In contrast to the circuit shown by Hartree the circuit of Fig. 4 requires no feedback and permits the carry storage unit, i. e., the multivibrator 73 to remain quiescent unless its output is a 0 and two 1's are received, or unless its output is a 1 and two 0's are received.

The operation of the bistable multivibrator 73 and its associated input coincidence gates 71 and 74 which, respectively, set the multivibrator 73 output to 1 and 0 is the same as the carry circuit described in connection with Fig. 1. The digits to be added appear at the output terminals of the shift registers 75 and 76 and are each applied to the input of the And gate 71 and also the input of an And Not gate 72. The latter gate is also described in more detail in the aforementioned Hussey application and produces an output only if one of the input signals and only one is a 1. The input digits to the And Not gate are each applied through delay circuits 77 to the enabling inputs of the gates 78. They are also applied by means of a signal inverter 79 to the inhibiting control of the gate 78 whose enabling control is associated with the opposite input. It may thus be seen that if both inputs are 1's both of the gates will be inhibited and no output will be produced from the And Not gate. If only one of the inputs is a 1, it will appear at the output terminal 81. The outputs of the And Not gate 72 and the bistable device 73 are then applied to a second anticoincidence or And Not gate 80, similar to the first one which will likewise produce an output only if one of the inputs, and only one, is a 1. The output of gate 72 at terminal 81 represents the partial sum, while the output of multivibrator 73, delayed one pulse period (plus a delay to compensate for the delays 77) by delay 82, represents the carry digit from the next previous addition. The output of the gate 80 is the sum of the input digits.

Although the invention has been described as relating to specific embodiments other embodiments and modifications will readily occur to one skilled in the art, so that the invention should not be deemed limited to the above-described specific illustrations.

What is claimed is:

1. A serial adder for adding successive pairs of binary digits comprising first and second shift register means being adapted to represent digits of one kind by a first output voltage and digits of another kind by a second output voltage, a first gate having three inputs and adapted to produce an output when one and only one of said inputs is enabled by voltages representative of digits of said one kind, a second gate having three inputs and adapted to produce an output only when all three of said inputs are enabled simultaneously by voltages representative of digits of said one kind, means for applying said output voltages from both of said first and second shift register means to first and second inputs of each of said first and second gates, means for deriving a voltage representative of the carry digit comprising a bistable device producing an output indicative of a digit of said one kind when in one of its stable states and indicative of a digit of said other kind when in its other stable state, means responsive to said first ouput voltage from both of said first and second shift register means for setting said bistable device in said one stable state if in said other stable state, means responsive to said second output voltage from both said first and second shift register means for setting said bistable device in said other state if in said one state, means for applying the output of said bistable device to the third input of each of said first and second gates, and means for combining the outputs of said first and second gates.

2. The combination according to claim 1 wherein said combining means and said bistable device setting means are normally disabled, and a source of timing pulses, means under control of said timing pulses for successively shifting pairs of digits to be added to the outputs of said first and second shift register means, means also under control of said timing pulses for enabling said combining means a predetermined interval after the shifting of each pair of digits, and means also under control of said timing pulses for enabling said bistable device setting means a further predetermined interval after the enabling of said combining means.

References Cited in the file of this patent

UNITED STATES PATENTS

| | | |
|---|---|---|
| 2,429,228 | Herbst | Oct. 21, 1947 |
| 2,535,303 | Lewis | Dec. 26, 1950 |
| 2,590,950 | Eckert et al. | Apr. 1, 1952 |
| 2,643,820 | Williams et al. | June 30, 1953 |
| 2,719,670 | Jacobs et al. | Oct. 4, 1955 |

OTHER REFERENCES

"Progress Report (2) on the Edvac," Moore School of Elec. Engineering, Univ. of Pa., Philadelphia, Pa. June 30, 1946, declassified Feb. 13, 1947, Office of Technical Services Publication Feb. 13, 1953; pages 1—1—15 and 1—1—15a (dwg. PYO-101).

"Electronic Anti-Aircraft Fire Control Predictor," RCA Research Lab. PB 80702 (Office of Technical Services, Dept. of Commerce, November, 1947). Pages 72–73, Fig. 3.21.

"An Electronic Digital Computer," Booth, Electronic Engineering, December 1950. Pages 497–498.